US010375733B2

(12) United States Patent
Jeong et al.

(10) Patent No.: US 10,375,733 B2
(45) Date of Patent: Aug. 6, 2019

(54) SCHEME FOR PERFORMING BEAMFORMING IN COMMUNICATION SYSTEM

(71) Applicant: Samsung Electronics Co. Ltd., Suwon-si, Gyeonggi-do (KR)

(72) Inventors: Su-Ryong Jeong, Yongin-si (KR); Yeong-Moon Son, Yongin-si (KR); Hyun-Kyu Yu, Yongin-si (KR); Tae-Young Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 13/890,551

(22) Filed: May 9, 2013

(65) Prior Publication Data

US 2013/0301567 A1 Nov. 14, 2013

(30) Foreign Application Priority Data

May 10, 2012 (KR) ........................ 10-2012-0049522

(51) Int. Cl.

*H04W 74/08* (2009.01)
*H04B 7/08* (2006.01)
*H04B 7/06* (2006.01)
*H04W 16/28* (2009.01)

(52) U.S. Cl.

CPC ...... *H04W 74/0833* (2013.01); *H04B 7/0695* (2013.01); *H04B 7/088* (2013.01); *H04W 16/28* (2013.01)

(58) Field of Classification Search

CPC ... H04W 72/04; H04W 72/00; H04W 72/046; H04W 72/085; H04W 72/0406; H04W 72/042; H04W 16/28; H04W 74/0833; H04B 7/0617; H04B 7/0632; H04B 7/0417; H04B 7/0408; H04B 7/0626;

(Continued)

(56) References Cited

U.S. PATENT DOCUMENTS 5,615,840 A 4/1997 Bushnell et al.
8,014,361 B2 * 9/2011 Ozluturk ............ H04W 74/004 370/208
2005/0153657 A1 7/2005 Maruta (Continued)

FOREIGN PATENT DOCUMENTS

CN 1116024 A 1/1996
JP 11-252614 A 9/1999
WO 2009/075622 A1 6/2009

OTHER PUBLICATIONS

Wang et al., Beam Codebook Based Beamforming Protocol for Multi-Gbps Millimeter-Wave WPAN Systems, IEEE Journal vol. 27, No. 8, Oct. 1, 2009.

*Primary Examiner* — Un C Cho
*Assistant Examiner* — Jose L Perez
(74) *Attorney, Agent, or Firm* — Jefferson IP Law, LLP

(57) ABSTRACT

A method of performing beamforming in a base station is provided. The method includes receiving random access channel signals transmitted in one or more transmit beams from a terminal, using one or more receive beams, determining at least one best transmit beam from the one or more transmit beams and at least one best receive beam from the one or more receive beams, and transmitting information about the best transmit beam and the best receive beam to the terminal.

12 Claims, 7 Drawing Sheets

(58) Field of Classification Search
CPC .... H04B 7/0695; H04B 7/0404; H04B 7/061; H04B 1/1027; H04B 7/088; H01Q 3/26
USPC .......................................... 370/329, 331, 335
See application file for complete search history.

(56) References Cited

U.S. PATENT DOCUMENTS

2006/0281494 A1* 12/2006 Wilson et al. ............. 455/562.1
2007/0243831 A1 10/2007 Seki
2009/0016460 A1 1/2009 Hwang et al.
2009/0116444 A1* 5/2009 Wang ................... H04B 7/0408 370/329
2009/0143073 A1 6/2009 Hovers et al.
2009/0175161 A1* 7/2009 Yi et al. ........................ 370/210
2009/0318157 A1* 12/2009 Hoshino .............. H04B 7/0452 455/450
2010/0090898 A1* 4/2010 Gallagher ................ H01Q 3/26 342/373
2010/0104036 A1* 4/2010 Liao ...................... H04L 1/0072 375/260
2010/0164805 A1 7/2010 Niu et al.
2010/0309854 A1* 12/2010 Wu ...................... H04B 7/0413 370/329
2010/0311452 A1* 12/2010 Li ......................... H04W 72/08 455/509
2011/0007721 A1 1/2011 Taghavi Nasrabadi et al.
2011/0110453 A1* 5/2011 Prasad ................. H04B 7/0695 375/285
2011/0113137 A1* 5/2011 Ramachandran et al. .... 709/224
2011/0149885 A1* 6/2011 Bachu ................. H04W 74/008 370/329
2012/0026987 A1* 2/2012 Jain ................... H04W 74/0866 370/336
2013/0286959 A1* 10/2013 Lou ....................... H04W 72/04 370/329

* cited by examiner

| | |
|---|---|
| BW-Req CH #1 | Rx Beam ID #1, ID #5... |
| BW-Req CH #2 | Rx Beam ID #2, ID #6... |
| ⋮ | ⋮ |

SCHEME FOR PERFORMING BEAMFORMING IN COMMUNICATION SYSTEM

PRIORITY

This application claims the benefit under 35 U.S.C. § 119(a) of a Korean patent application filed on May 10, 2012 in the Korean Intellectual Property Office and assigned Serial No. 10-2012-0049522, the entire disclosure of which is hereby incorporated by reference.

BACKGROUND OF THE INVENTION

1. Field of the Invention

The present invention relates to a method and apparatus for increasing a data rate in a communication system. More particularly, the present invention relates to a method and apparatus for efficiently performing beamforming.

2. Description of the Related Art

Communication systems have been developed to support higher data rates to meet the need for steadily increasing wireless data traffic. For example, fourth generation wireless communication systems have sought to develop technologies toward improving spectral efficiency to increase data rates. Since such technologies are not enough to meet the need for the ever increasing amount of wireless data traffic, a very wide frequency band is also required. However, it is difficult to secure a wide frequency band below 10 GHz, so the wide frequency band should be secured from higher than 10 GHz. However, the higher the transmission frequency for wireless communication, the shorter the propagation range, thus causing reduction of service coverage.

Accordingly, there is a need for an improved apparatus and method for increasing a data rate in a communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for increasing data rate in a communication system.

Another aspect of the present invention is to provide a method and apparatus for efficiently performing beamforming to increase a data rate in a communication system.

Another aspect of the present invention is to provide a method and apparatus for having quick uplink access using beamforming in a communication system.

In accordance with an aspect of the present invention, a method of performing beamforming in a base station is provided. The method includes receiving random access channel signals transmitted in one or more transmit beams from a terminal, using one or more receive beams, determining at least one best transmit beam from the one or more transmit beams and at least one best receive beam from the one or more receive beams, and transmitting information about the best transmit beam and the best receive beam to the terminal.

In accordance with another aspect of the present invention, a method of performing beamforming in a terminal is provided. The method includes transmitting to a base station random access channel signals using one or more transmit beams, and receiving from the base station information about at least one best transmit beam among the one or more transmit beams and information about at least one best receive beam among receive beams of the base station used to receive the random access channel signals.

In accordance with another aspect of the present invention, a base station for performing beamforming is provided. The base station includes a transceiver for receiving random access channel signals transmitted in one or more transmit beams from a terminal, using one or more receive beams, and a controller for determining at least one best transmit beam from the one or more transmit beams and at least one best receive beam from the one or more receive beams, and for transmitting information about the best transmit beam and the best receive beam to the terminal.

In accordance with another aspect of the present invention, a terminal for performing beamforming is provided. The terminal includes a transceiver for communicating signals with a base station, and a controller for transmitting to the base station random access channel signals using one or more transmit beams, and for receiving from the base station information about at least one best transmit beam among the one or more transmit beams and information about at least one best receive beam among receive beams used to receive the random access channel signals.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Beamforming is a technology to increase a radio propagation range, including transmit (Tx) beamforming and receive (Rx) beamforming. Transmit beamforming focuses the radio propagation range toward a particular direction using a set of multiple antennas called an antenna array whose element, i.e., each antenna, is called an array element. Using the transmit beamforming not only increases the radio propagation range but also reduces interference with neighboring cells since signal intensity in other directions than the focused direction is weak.

The receive beamforming uses the antenna array on a receiver's side, focusing a radio receivable area toward a particular direction, thereby increasing the radio reception range, and reducing the reception gain of a transmitted signal in other directions than the focused direction, thereby reducing interference with neighboring cells.

For performing beamforming, beam alignment operations should be performed to align beams between a transmitter and a receiver, which may be proceeded with a random access procedure. To perform such beam alignment operations, the transmitter or the receiver performs a procedure of transmitting or receiving beams while shifting beam directions, to find the best beam.

Figure 1:
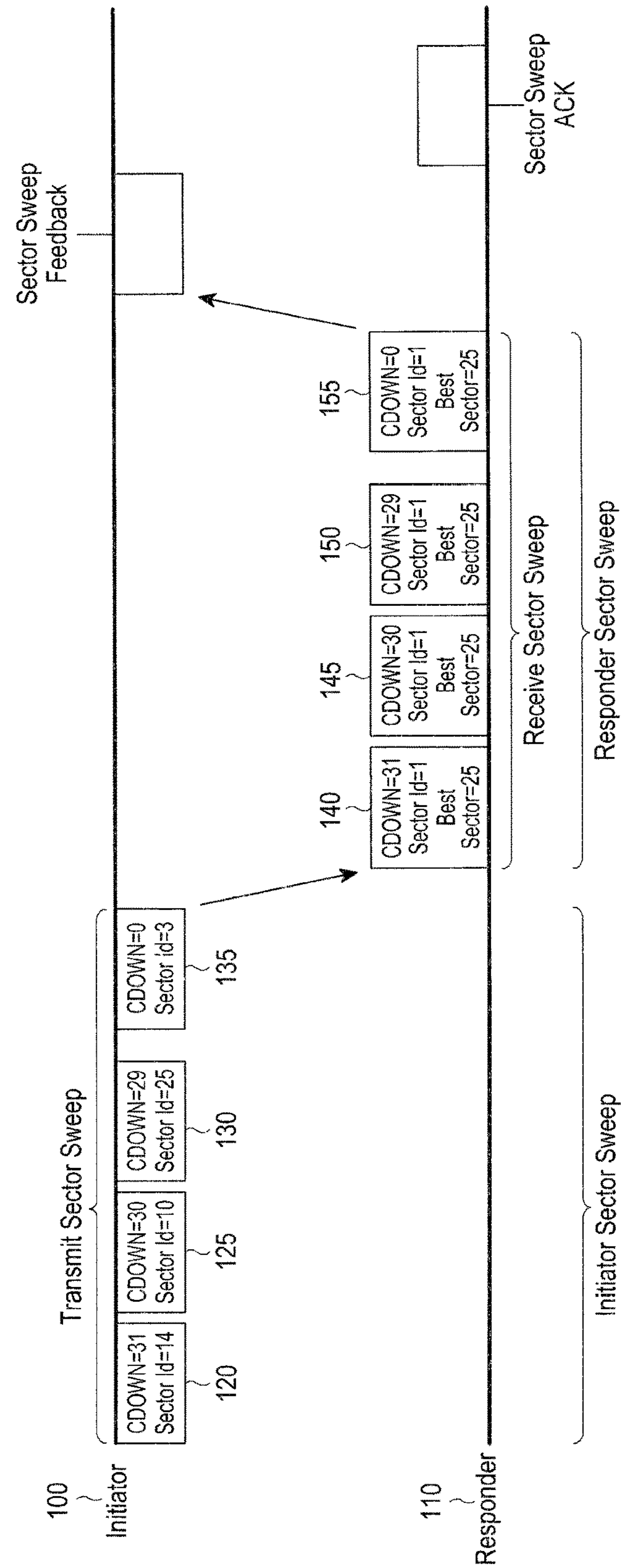
FIG. 1 is a schematic diagram to explain beam alignment performed in a communication system according to an exemplary embodiment of the present invention.

FIG. 1 is a schematic diagram to explain beam alignment performed in a communication system according to an exemplary embodiment of the present invention.

Referring to FIG. 1, an initiator 100, which may be a transmitter, sequentially transmits beams 120, 125, 130, and 135 toward different beam directions distinguished by respective sector IDentities (IDs), and the responder 110, which may be a receiver, sequentially receives the beams 120, 125, 130, and 135 and sends information about a best transmit (Tx) beam (e.g., the beam 130 whose sector ID is 25) back to the initiator 100 by carrying the information in signals 140, 145, 150, and 155 to be transmitted to the initiator 100.

Figure 2:
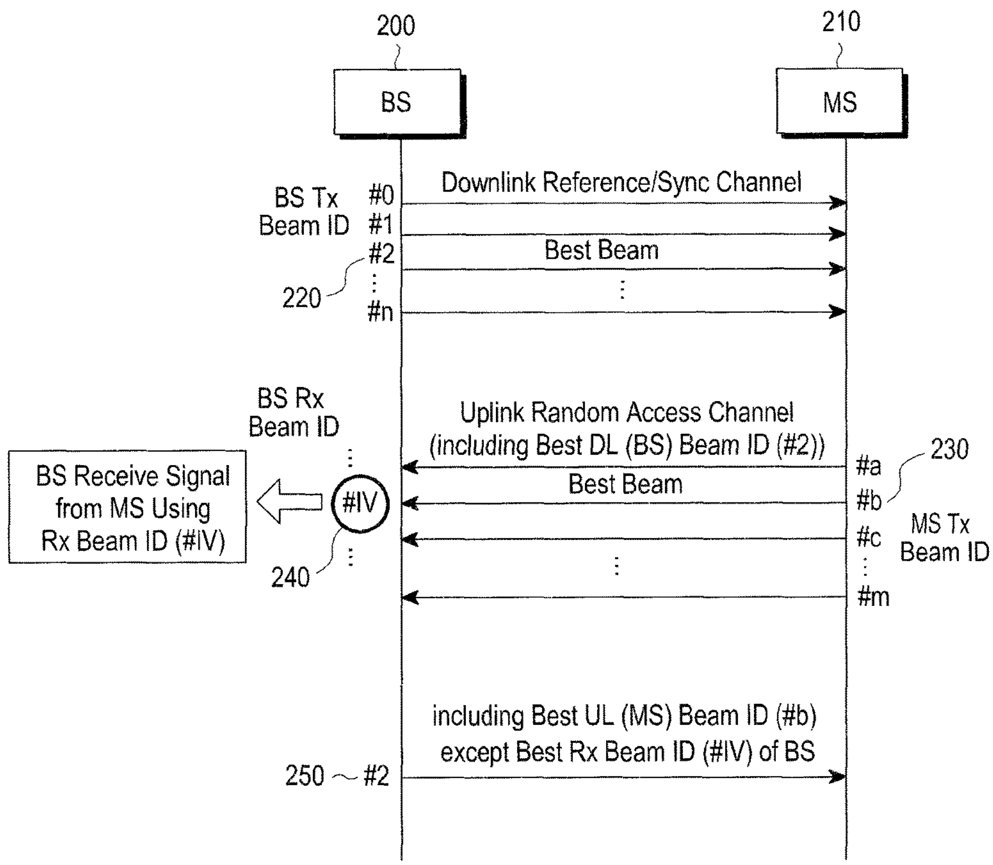
FIG. 2 is a schematic diagram to explain beam alignment performed in a communication system according to an exemplary embodiment of the present invention.

FIG. 2 is a schematic diagram to explain beam alignment performed in a communication system according to an exemplary embodiment of the present invention. An exemplary beam alignment process shown herein may be performed during an initial entry procedure or a random access procedure.

Referring to FIG. 2, a Base Station (BS) 200 transmits a sync signal to respective beam directions on a downlink channel, where #0 to #n identifies beams for different directions. A terminal (also called a Mobile Station (MS)) 210, to make an entry to the service coverage area of the BS 200, measures received signal intensity of the respective beams #0 to #n transmitted by the BS 200, and determines a downlink sync signal that has the best signal intensity and the corresponding transmit beam ID (e.g., #2, 220). The MS 210 stores information about the best transmit beam ID 220 of the BS 200 for later transmission together with a signal to the BS 200 on an uplink random access channel or an initial ranging channel.

If the MS 210 has one or more transmit beam directions #a to #m, the MS 210 sequentially transmits an uplink random access signal or an initial ranging signal to each of the directions #a to #m. The BS 200 tries to receive the uplink random access signal or the initial ranging signal, and if the reception is successful, determines a transmit beam ID having the best receive signal intensity, e.g., #b, 230 among received signals. The BS 200 identifies the transmit beam ID 220 of the BS 200, transmitted by the MS 210, and transmits 250 information about the best uplink transmit beam ID 230 of the MS 210 determined by the BS 200 to the MS 210 in the direction of the transmit beam ID 220 of the BS 200.

As such, a receiver may guide a transmitter to transmit signals in the best beam direction by finding the best beam that has the best signal intensity and informing the transmitter of the ID of the best beam.

In the foregoing beam alignment process, aligning receive beamforming directions was not described because, in case of receive beamforming, the receiver may determine by itself the best receive (Rx) beam direction 240 that has the best signal intensity by several repetitive receptions and may apply the determined receive beam. For instance, since the BS 200 knows what point in time and which channel the MS 210 uses for transmission while the BS 200 assigns resources to the MS 200, the BS 200 may operate to receive a signal transmitted at the same point in time on the same channel in the receive beamforming direction.

However, the case that the receiver is capable of receiving the signal with its own receive beam is only true if the receiver exactly knows when the transmitter transmits. Thus, if the receiver does not know when the transmitter transmits, smooth signal transmission and reception may not be guaranteed because the receiver is not capable of forming a proper beam for the transmitter.

For example, in a case that the MS 210 operates as the transmitter and the BS 200 operates as the receiver, if the MS 210 sends a resource assignment request in a BandWidth (BW)-request message for uplink transmission at a particular point in time, it is difficult for the BS 200 to determine an operation time of the receive beam for the MS 210 because the BS 200 may not know when the MS 210 is going to transmit the resource assignment request. Furthermore, the MS 210 may request the BS 200 to transmit a control/reference signal, such as a reference signal, a sounding signal, etc. due to a change of the channel condition, but the BS 200 is unaware of when it was requested by the MS 200. In addition, it may happen that the MS 210 determines to perform handover and sends a handover request to the BS 200.

In the example, the MS 210 randomly transmits the uplink signal to the BS 200, which may happen when a channel for random access, such as initial random access, i.e., a Random Access CHannel (RACH) is used. Since the BS 200 may not know when the MS 210 is going to transmit a signal, the BS 200 repeatedly attempts reception with all receive beams in some order and cycles, and if a signal has been received in sync with the receive beam direction, decodes the signal. The MS 210 may not know when the BS 200 operates a receive beam aligned with the MS 210 even if the MS 210 knows the transmit beam direction for the BS 200, so the MS 210 repeatedly transmits transmit beams in a particular direction until reception is successful at the BS 200.

In this case, unnecessary power consumption occurs between the BS 200 and the MS 210 and the possibility of a successful reception may be decreased due to increased interference with the BS 200.

In an exemplary embodiment of the present invention, smooth signal communication is effectively guaranteed by notifying the MS 210 of information about the reception beam of the BS 200.

Figure 3:
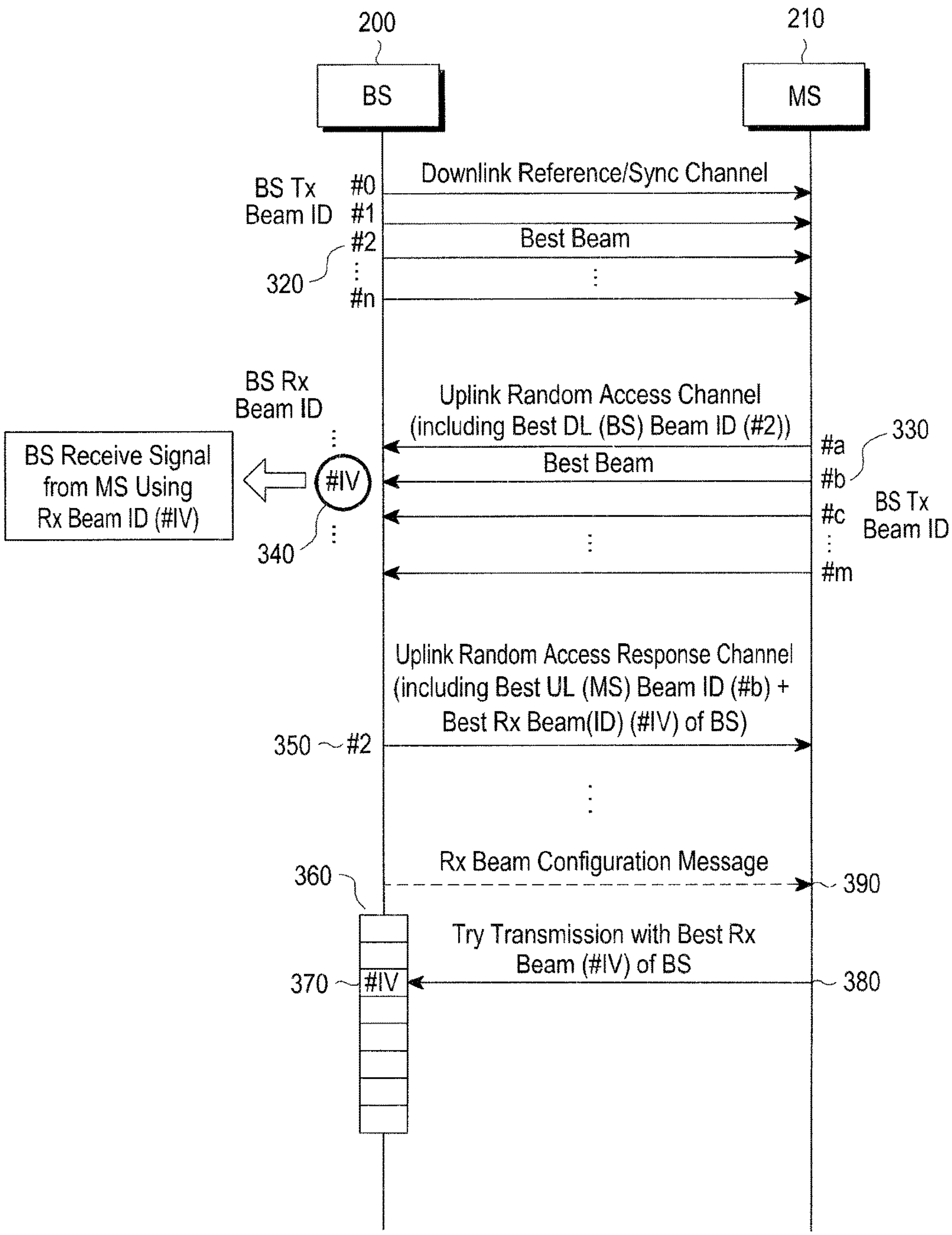
FIG. 3 is a schematic diagram to explain beam alignment performed in a communication system according to an exemplary embodiment of the present invention.

FIG. 3 is a schematic diagram to explain beam alignment performed in a communication system according to an exemplary embodiment of the present invention. An exemplary beam alignment process described below may be performed in e.g., an initial entry procedure or a random access procedure.

Referring to FIG. 3, the BS 200 transmits a sync signal to respective beam directions on a downlink channel, where #0 to #n identifies beams for different directions. The MS 210, to make an entry to the service coverage area of the BS 200, measures received signal intensity of the respective beams #0 to #n, and determines a best downlink sync signal that has the best signal intensity and the corresponding transmit beam ID (e.g., #2, 320). At this time, the MS 210 may determine one or more best transmit beams of the BS 200. In other words, the MS 210 may determine an upper x % of transmit beams that have good receive signal intensities to be the best transmit beams. Here, x is a certain threshold value which may be e.g., 20. The MS 210 then stores information about the best transmit beam ID 320 of the BS 200 for later transmission with a signal to the BS 200 on an uplink random access channel or an initial ranging channel.

If the MS 210 has one or more transmit beam directions #a to #m, the MS 210 sequentially transmits an uplink random access channel signal or an initial ranging signal to each of the directions #a to #m. The BS 200 attempts to receive the uplink random access channel signal or an initial ranging signal, and if the reception is successful, determines a transmit beam ID having the best receive signal intensity, e.g., #b, 330 among received signals. At this time, the BS 200 may determine one or more best transmit beams of the MS 210. In other words, the BS 200 may determine an upper x % of transmit beams that have good receive signal intensities to be the best transmit beams. Here, x is a certain threshold value which may be e.g., 20. The random access channel signal may include e.g., a random access preamble message of the Long Term Evolution (LTE) system, a Range Request (RNG_REQ) message, etc.

The BS 200 identifies the best transmit beam ID 320 of the BS 200 transmitted from the MS 210, and transmits 350 information about the best uplink transmit beam ID 330 of the MS 210 determined by the BS 200 to the MS 210 in the direction of the best transmit beam ID 320 of the BS 200 on an uplink random access response channel. The BS 200 determines the best receive beam ID (e.g., #IV, 340) by performing a process of aligning receive beamforming directions and transmits information about the best receive beam 340 to the MS 210. That is, the BS 200 transmits the best uplink transmit beam ID 330 of the MS 210 and the best receive beam ID 340 of the BS 200 to the MS 200. At this time, the BS 200 may determine one or more best receive beams of the BS 200. In other words, the BS 200 may determine an upper x % of receive beams that have good receive signal intensities to be the best receive beams. Here, x is a certain threshold value which may be e.g., 20.

The BS 200 transmits 390 a receive beam configuration message 360 that represents a configuration format of the receive beam of the BS 200 for uplink channels on which terminals are capable of randomly transmitting signals, such as the BW-request channel, a reference channel-request channel, a handover-request channel, etc., to all MSs in the cell. The receive beam configuration message 360 may be broadcasted because the receive beam configuration message 360 is not terminal specific (or UE-specific) information. For example, the receive beam configuration message 360 may be transmitted in the form of a periodic broadcast message. Although illustrated in FIG. 3 as transmitted after transmission of the uplink random access response channel, the receive beam configuration message 360 may be periodically transmitted from the BS 200 to terminals at any time. For example, the receive beam configuration message 360 may be transmitted before transmission of the downlink reference channel or the sync channel. In an exemplary embodiment, the configuration format of the receive beam represents a BS receive beam sequence of the uplink channels that terminals may arbitrarily access. In another exemplary embodiment, the configuration format of the receive beam represents mapping relations between sub-channels that make up a channel on which terminals may randomly transmit signals and corresponding receive beams.

Upon reception 390 of the receive beam configuration message 360, the MS 210 transmits 380 a signal to the BS 200 using a receive beam ID of the BS 200 or associated information. In an exemplary embodiment, the MS 210 transmits the signal on a sub-channel that corresponds to receive beam ID #IV 370.

Figures 4A, 4B:
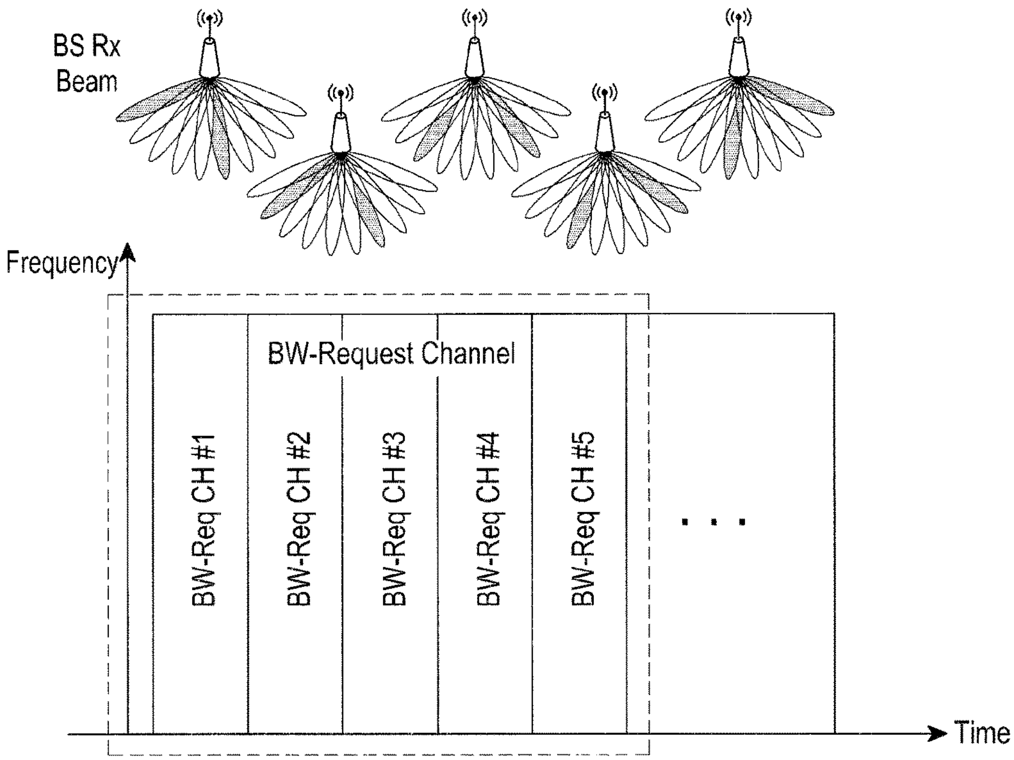
FIGS. 4A and 4B are diagrams in terms of a receive beam configuration message according to an exemplary embodiment of the present invention.

FIGS. 4A and 4B are diagrams in terms of a receive beam configuration message according to an exemplary embodiment of the present invention.

In exemplary embodiments of the present invention, the receive beam configuration message may be configured in different ways. As an example, the receive beam configuration message may be configured to directly specify receive beam indexes that correspond to respective sub-channels that form a particular channel or to include an index to indicate a set order or form of the receive beam indexes that correspond to the respective sub-channels. The order or form of the receive beam indexes that correspond to the respective sub-channels may be predetermined and shared by the BS 200 and the MS 210.

Referring to FIG. 4A, a method of configuring a BW-request channel is illustrated using a frequency-time plane. The BW-request channel may include a number of sub-channels (e.g., BW-Req CH #1 to #5), each of which is assigned at least one receive beam.

FIG. 4B illustrates a receive beam configuration message that may include information regarding receive beam indexes assigned to the respective sub-channels. For example, CHannel 1 (CH #1) is assigned receive beam IDs 1, 5, etc., and CHannel 2 (CH #2) is assigned receive beam IDs 2, 6, etc.

Figure 5:
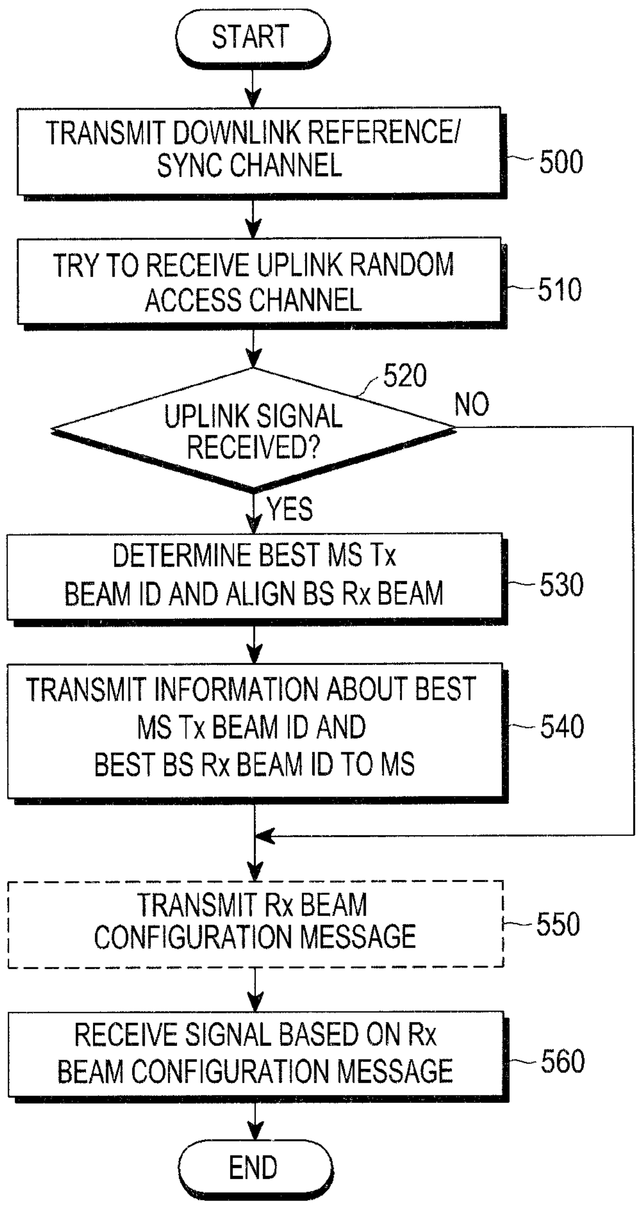
FIG. 5 is a flowchart of operations of a base station according to an exemplary embodiment of the present invention.

FIG. 5 is a flowchart of operations of a BS according to an exemplary embodiment of the present invention.

Referring to FIG. 5, the BS 200 transmits a downlink reference signal or a sync channel to the MS 210 in step 500, and attempts reception for an uplink random access channel in step 510. If an uplink random access signal is received from the MS 210 in 520, the BS 200 determines a transmit beam ID of the MS 210 by determining a best signal among signals transmitted by the MS 210 and decoding it while doing receive beam alignment, in step 530. Otherwise, if the uplink random access signal is not received from the MS 210 in 520, the BS 200 proceeds to step 550 to perform operations related to a receive beam configuration message. The receive beam configuration message to be transmitted if the uplink random access channel signal has not received from the MS 210 may be information to be transmitted by the BS 200 for existing access terminals.

After determining the transmit beam ID of the MS 210, the BS 200 transmits information about the transmit beam which includes the best transmit beam ID of the MS 210 and information about the receive beam which includes the receive beam ID of the BS 200 used to receive the transmit beam of the MS 210 to the MS 210 that transmitted the random access signal, on a random access response channel, in step 540.

Furthermore, the BS 200 transmits a receive beam configuration message for channels randomly accessible by terminals, such as the BW-request channel, the reference channel-request channel, the handover-request channel, etc. to the terminals in step 550, and in return, receives signals transmitted on at least one of the BW-request channel, the reference channel-request channel, the handover-request channel, etc., based on the receive beam configuration message in step 560. At this time, the BS 200 sequentially tries to receive a signal from the MS 210 using a receive beam that corresponds to each of the plurality of sub-channels that form the channel. The receive beam configuration message used by the BS 200 to receive a signal may not necessarily be transmitted at the same time as described in connection with FIG. 5 but transmitted at any time. In other words, the BS 200 may not transmit the receive beam configuration message only after transmission of the information about the best terminal transmit beam ID and the information about the best BS receive beam ID, as indicated by 540, but may periodically broadcast the receive beam configuration message. In the exemplary embodiment illustrated in FIG. 5, transmission of the receive beam configuration message is followed by the step 540.

Figure 6:
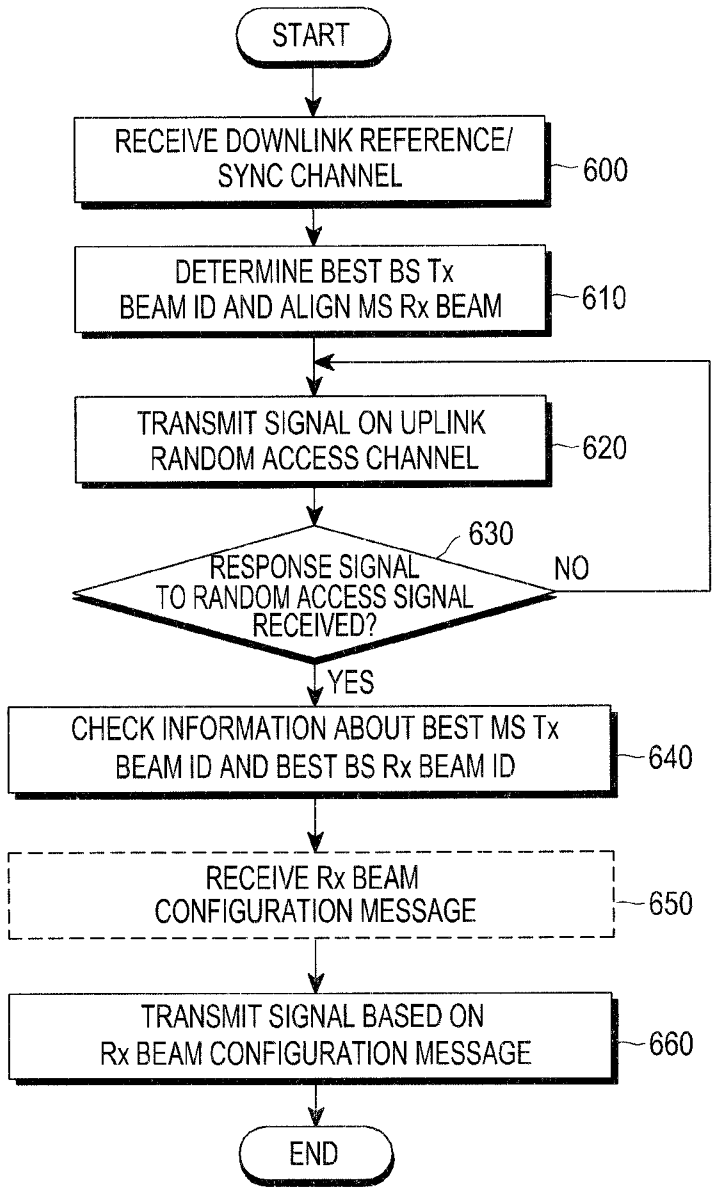
FIG. 6 is a flowchart of operations of a terminal according to an exemplary embodiment of the present invention.

FIG. 6 is a flowchart of operations of an MS 210 according to an exemplary embodiment of the present invention.

Referring to FIG. 6, the MS 210 obtains sync and BS information by receiving a downlink reference or sync channel, in step 600, and determines a best downlink transmit beam ID of the BS 200 while aligning receive beams of the MS 210, in step 610. While attempting an entry to service coverage area of the BS 200, the MS 210 transmits information about the best transmit beam ID of the BS 200 with an uplink random access signal, in step 620. If a response signal to the random access signal has been received from the BS 200 in step 630, the MS 210 checks information about a best transmit beam ID of the MS 210 and information about a best receive beam ID of the BS 200 in step 640. Otherwise, if the response signal has not been received from the BS 200 in step 630, the MS 210 recognizes the failure of the random access and goes back to the step 620 to again attempt entry to the service coverage area of the BS 200.

After checking the information about the best receive beam ID of the BS 200, the MS 210 receives a receive beam configuration message that includes receive beam configuration of the BS 200 for channels accessible by the MS 210 at any time, such as the BW-request channel, the reference channel-request channel, the handover-request channel, etc. in step 650, and transmits a signal on a sub-channel that corresponds to the best receive beam ID of the BS 200 based on the receive beam configuration message in step 660. The receive beam configuration message based on which the MS 210 transmits a signal on the sub-channel in step 660 may not necessarily be received as illustrated in FIG. 6 but received at any time. In other words, the MS 210 may not receive the receive beam configuration message only after reception of the information about the best terminal transmit beam ID and the information about the best BS receive beam ID, as indicated by 640, but may periodically receive the broadcast receive beam configuration message. In the exemplary embodiment illustrated in FIG. 6, reception of the receive beam configuration message is followed by the step 640.

Meanwhile, the BS 200 and the MS 210 each include a transmitter for transmitting the signal, a receiver for receiving the signal, a controller for controlling operations of the transmitter and the receiver, etc., each of which operates as described above.

Figure 7:
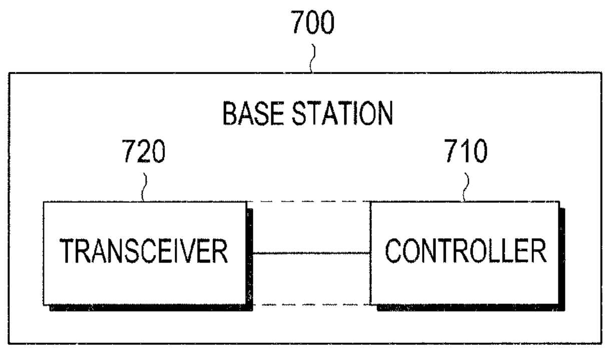
FIG. 7 is a block diagram of a base station according to an exemplary embodiment of the present invention.

FIG. 7 is a block diagram of a BS according to an exemplary embodiment of the present invention.

Referring to FIG. 7, a BS 700 may include a transceiver 720 for transmitting a receive beam configuration message, a downlink reference channel signal, a sync channel signal, an uplink random access response channel signal, etc. to a terminal and for receiving e.g., an uplink random access channel signal from the terminal, and a controller 710 for controlling the operation of the transceiver 720. It should be understood that the controller 710 controls general operations of the BS 700. The transceiver 720 and the controller 710 may be implemented separately as a Radio Frequency (RF) module and a processor, respectively, or may be incorporated in a single module.

More specifically, the transceiver 720 may include an antenna unit (not shown) that has a plurality of array elements for transmitting and receiving RF signals, a beamforming unit (not shown) that performs beamforming on the signals, a modem (not shown) that performs signal reconstruction, modulation/demodulation, coding/decoding, etc., and one or more RF chains (not shown) that perform conversion on a received RF signal and a baseband digital signal for signal delivery between the beamforming unit and the modem unit.

Figure 8:
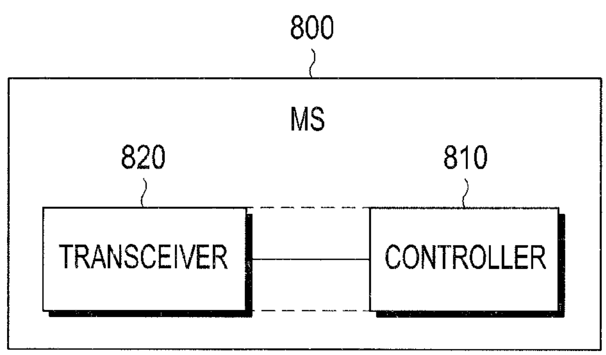
FIG. 8 is a block diagram of a terminal according to an exemplary embodiment of the present invention.

FIG. 8 is a block diagram of a terminal according to an exemplary embodiment of the present invention.

Referring to FIG. 8, a terminal 800 may include a transceiver 820 that transmits e.g., an uplink random access channel signal to a BS and receives a receive beam configuration message, a downlink reference channel signal, a sync channel signal, an uplink random access response channel signal, etc., and a controller 810 that controls operations of the transceiver 820. It should be understood that the controller 810 controls general operations of the terminal 800. The transceiver 820 and the controller 810 may be implemented separately as an RF module and a processor, respectively, or may be incorporated in a single module. Details of the transceiver 820 of the terminal 800 may be similar to those of the transceiver 720 of the BS 700, or may only include part of components of the transceiver 720 due to hardware constraints.

The foregoing operations may be implemented by program codes stored in a storage equipped in the BS 700 or the terminal 800. In other words, the controller 710 or 810 may perform the foregoing operations by reading out and executing the program codes with a processor or the Central Processing Unit (CPU).

Various components and modules of the BS 700 and the terminal 800 may be implemented in hardware, such as Complementary Metal Oxide Semiconductor (CMOS)-based logic circuits, firmware, software, or a combination thereof. For example, they may be practiced using electrical circuits, such as transistors, logic gates, and Application Specific Integrated Circuits (ASICs).

Any such software may be stored in a computer readable storage medium. The computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and exemplary embodiments suitably encompass the same.

According to exemplary embodiments of the present invention, smooth communication is achieved by efficiently performing beamforming and thus increasing data rate and reducing power consumption and interference.

Several exemplary embodiments have thus been described, but it will be understood that various modifications can be made without departing the scope of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of performing beamforming in a base station, the method comprising:

transmitting, to a terminal, a receive beam configuration message indicating a mapping relation between a plurality of receive beams of the base station and a plurality of resource regions within an uplink resource region on a time and frequency domain;

receiving random access signals transmitted through a plurality of transmit beams of a terminal, the random access signals being received through the plurality of receive beams of the base station;

determining at least one best transmit beam from among the plurality of transmit beams based on the received random access signals, the at least one best transmit beam indicating at least one transmit beam selected for signal transmission in the terminal;

determining at least one best receive beam from among the plurality of receive beams based on the received random access signals, the at least one best receive beam indicating at least one receive beam selected for signal reception in the base station;

transmitting information identifying the at least one best transmit beam and information identifying the at least one best receive beam from among the plurality of receive beams to the terminal; and receiving an uplink signal through the at least one best receive beam on a resource region mapped to the at least one best receive beam, wherein the resource region to be used for receiving the uplink signal is selected from among the plurality of resource regions allocated to the plurality of receive beams of the base station as indicated by the mapping relation represented in the receive beam configuration message.

2. The method of claim 1, wherein the uplink signal comprises at least one of a bandwidth request channel signal, a reference channel-request channel signal, or a handover request channel signal.

3. A method of performing beamforming in a terminal, the method comprising:

receiving, from a base station, a receive beam configuration message indicating a mapping relation between a plurality of receive beams of the base station and a plurality of resource regions within an uplink resource region on a time and frequency domain;

transmitting, to the base station, random access signals through a plurality of transmit beams of the terminal;

receiving, from the base station, information identifying at least one best transmit beam from among the plurality of transmit beams and information identifying at least one best receive beam from among the plurality of receive beams of the base station; and transmitting to the base station, an uplink signal through the at least one best transmit beam on a resource region mapped to the at least one best receive beam, wherein the at least one best transmit beam is selected by the base station based on the transmitted random access signals, wherein the at least one best receive beam is selected by the base station based on the transmitted random access signals, and wherein the resource region to be used for transmitting the uplink signal is selected from among the plurality of resource regions allocated to the plurality of receive beams of the base station as indicated by the mapping relation represented in the receive beam configuration message.

4. The method of claim 3, wherein the uplink signal comprises at least one of a bandwidth request channel signal, a reference channel-request channel signal, or a handover request channel signal.

5. A base station for performing beamforming, the base station comprising:

a transceiver configured to:

transmit, to a terminal, a receive beam configuration message indicating a mapping relation between a plurality of receive beams of the base station and a plurality of resource regions within an uplink resource region on a time and frequency domain, and receive random access signals transmitted through a plurality of transmit beams of a terminal, the random access signals being received through the plurality of receive beams of the base station; and at least one processor configured to:

determine at least one best transmit beam from among the plurality of transmit beams based on the received random access signals, the at least one best transmit beam indicating at least one transmit beam selected for signal transmission in the terminal, and determine at least one best receive beam from among the plurality of receive beams based on the received random access signals, the at least one best receive beam indicating at least one receive beam selected for signal reception in the base station, wherein the transceiver is further configured to:

transmit information identifying the at least one best transmit beam and information identifying the at least one best receive beam from among the plurality of receive beams to the terminal, and receive an uplink signal through the at least one best receive beam on a resource region mapped to the at least one best receive beam, wherein the resource region to be used for receiving the uplink signal is selected from among the plurality of resource regions allocated to the plurality of receive beams of the base station as indicated by the mapping relation represented in the receive beam configuration message.

6. The base station of claim 5, wherein the uplink signal comprises at least one of a bandwidth request channel signal, a reference channel-request channel signal, or a handover request channel signal.

7. A terminal for performing beamforming, the terminal comprising:

a transceiver configured to:

receive, from a base station, a receive beam configuration message indicating a mapping relation between a plurality of receive beams of the base station and a plurality of resource regions within an uplink resource region on a time and frequency domain;

transmit, to the base station, random access signals through a plurality of transmit beams of the terminal, receive, from the base station, information identifying at least one best transmit beam from among the plurality of transmit beams and information identifying at least one best receive beam from among the plurality of receive beams of the base station, and transmit, to the base station, an uplink signal through the at least one best transmit beam on a resource region mapped to the at least one best receive beam; and a controller configured to select the resource region to be used for transmitting the uplink signal from among the plurality of resource regions allocated to the plurality of receive beams of the base station as indicated by the mapping relation represented in the receive beam configuration message, wherein the at least one best transmit beam is selected by the base station based on the transmitted random access signals, and the at least one best receive beam is selected by the base station based on the transmitted random access signals.

8. The terminal of claim 7, wherein the uplink signal comprises at least one of a bandwidth request channel signal, a reference channel-request channel signal, or a handover request channel signal.

9. A non-transitory computer-readable storage medium storing instructions that, when executed, cause at least one processor to perform the method of claim 1.

10. A non-transitory computer-readable storage medium storing instructions that, when executed, cause at least one processor to perform the method of claim 3.

11. The method of claim 1, wherein the information identifying the at least one best receive beam from among the plurality of receive beams comprises a receive beam ID.

12. The method of claim 1, wherein the at least one best transmit beam comprises an upper percentage of the plurality of transmit beams having a signal intensity above a first threshold value from among the plurality of transmit beams, and wherein the at least one best receive beam comprises an upper percentage of the plurality of receive beams having a signal intensity above a second threshold value from among the plurality of receive beams.

* * * * *